United States Patent
Sato et al.

[11] Patent Number: 5,633,673
[45] Date of Patent: May 27, 1997

[54] RECORDING SYSTEM

[75] Inventors: Kaoru Sato, Yokohama; Toshiyuki Itoh, Sagamihara; Akihisa Kusano, Kawasaki; Makoto Abe, Kashiwa; Toshihiko Inuyama, Fujisawa; Masanori Ishizu, Tokyo; Kazuhiko Okazawa, Kawasaki; Junichi Kimizuka, Yokohama, all of Japan

[73] Assignee: Canon Kabushiki Kaisha, Tokyo, Japan

[21] Appl. No.: 337,561

[22] Filed: Nov. 14, 1994

Related U.S. Application Data

[63] Continuation of Ser. No. 200,299, Feb. 23, 1994, abandoned, which is a continuation of Ser. No. 689,553, Apr. 23, 1991, abandoned.

[30] Foreign Application Priority Data

Apr. 24, 1990 [JP] Japan .................................. 2-106600

[51] Int. Cl.$^6$ ........................................................ B41J 2/47
[52] U.S. Cl. ........................... 347/240; 347/131; 358/298
[58] Field of Search .................................. 347/240, 237, 347/247, 234, 248, 251, 131, 132; 358/298, 300, 302, 296

[56] References Cited

U.S. PATENT DOCUMENTS

| | | | |
|---|---|---|---|
| 4,742,363 | 5/1988 | Shiraishi | 346/108 |
| 4,768,043 | 8/1988 | Saito et al. | 346/108 |
| 4,816,924 | 3/1989 | Sekiya | 358/296 |
| 4,862,288 | 8/1989 | Sekiya | 358/298 |
| 4,862,289 | 8/1989 | Shimada | 358/298 |
| 4,872,025 | 10/1989 | Sekiya et al. | 346/108 |
| 5,045,869 | 9/1991 | Isaka et al. | 346/108 |
| 5,142,304 | 8/1992 | Sato et al. | 346/108 |

*Primary Examiner*—Mark J. Reinhart
*Attorney, Agent, or Firm*—Fitzpatrick, Cella, Harper & Scinto

[57] ABSTRACT

Disclosed is a recording system in which an operation performed on the side of a printer unit in order to change over recording density is delayed while a recording operation is in progress. When a recording density changeover command is received during a recording operation, the density changeover is performed after the recording operation ends. A control unit which controls the printer unit is informed of the fact that the measures for changing over the recording density have been completed on the printer unit side.

37 Claims, 8 Drawing Sheets

RECORDING SYSTEM

This application is a continuation of application Ser. No. 08/200,299 filed Feb. 23, 1994, now abandoned, which was a continuation of application Ser. No. 07/689,553 filed Apr. 23, 1991, now abandoned.

BACKGROUND OF THE INVENTION

This invention relates to a recording system comprising a control apparatus and a recording apparatus which changes recording density upon receiving a recording density changeover command from the control unit.

Many recording apparatus such as laser-beam printers have been disclosed in which a printer control unit having a high-speed data processing function is incorporated in addition to a printing unit which executes the actual printing on a medium. The unit that actuates the actual printing on the medium shall be referred to as a "printer unit", and the unit for controlling the latter shall be referred to as a "printer control unit".

In such a recording apparatus, the conventional practice generally is for the recording density to be fixedly set for each apparatus. When the printing recording density is to be changed, a serviceman makes the correction as by changing the rotational speed of a polygon motor.

Accordingly, the present applicant has disclosed art in which recording density is changed over in real-time using changeover means for changing the scanning timing of the laser beam.

In a recent printer control unit, vector font data sent from a host computer is converted into a raster image for the printer unit, and then the raster image is stored in its own random-access memory (hereinafter referred to as a "RAM"). This is a so-called postscript printer system. In order to make RAM capacity as small as possible in a control unit of this type for the purpose of reducing cost, a new raster image is developed in a RAM before changing over the printing recording density, without providing a raster-image RAM for every printing recording density of the recording unit.

A problem encountered is the point in time at which the change in recording density is to be made. The reason is that while the initiative for issuing the density changeover command resides with the printer control unit (and more particularly, with the host computer that sends the changeover command to the control unit), the activity required in order to change the recording density, e.g., the activity for changing the rotational speed of a polygon mirror, is carried out on the side of the printer unit.

If the serviceman performs the density changeover operation in the field, no problems arise because the printer unit will be off when the change is made.

However, if the recording density is changed in real-time as in the art proposed above, namely if the density changeover command is sent from the printer control unit side to the printer unit side and the operation for changing density is performed on the side of the printer unit based upon this command, the following problem arises:

If the recording density changeover is carried out within the printer unit during exposure, the rotational speed of the polygon motor changes and, as a matter of course, printing cannot be performed properly. Accordingly, the change in recording density must not be performed during exposure. This is the minimum requirement.

A major problem that arises is the following:

In a postscript-type printer control unit in which a raster image is developed in a RAM within the control unit, the time at which the raster image data in the RAM should be rewritten cannot be ascertained on the side of the printer control unit unless the latter is capable grasping correctly the timing at which the printing density changeover was performed on the side of the printer unit.

Accordingly, a technique has been conceived in which the recording paper is partitioned page by page and the printing density changeover timing is judged on the side of the control unit to be that at which transmission of each page of exposure data is completed.

However, if the printer unit is one capable of high-speed printing, another problem arises. Specifically, since the printer unit prints at high speed, several sheets of recording paper are present in the paper conveyance path of the printer unit. In a printer unit of this type, assume that the associated control unit has issued a 300 dpi→600 dpi density changeover command. Further, in a case where the timing for the changeover to 600 dpi is judged on the side of the control unit based upon the moment at which transmission of the first page of exposure data has been completed, and the second page of raster image data starts to be written in the RAM at 600 dpi from the moment of the judged timing, assume that a situation arises in which the first page of printing paper fails to be printed on for some reason, such as jamming of this sheet inside the printer unit. Ordinarily, in order to recover from jamming, the raster image of the first page must again be developed in the RAM at 300 dpi, which was the printing density originally intended for this page.

The fact that the data pertaining to the jammed page of recording paper must be re-developed in the RAM, i.e., the fact that the printing density must be returned to the original printing density, results in a major decline in efficiency. This can be fatal in a high-speed printer unit in which several sheets of recording paper can be present in the paper conveyance path at any time. In addition to returning to the original recording density when recovering from jamming, it becomes necessary to call the fonts for the original recording density. In particular, in a printer unit of the kind capable of changing over Chinese characters at various recording densities, generally the fonts corresponding to the printing density prior to the change are kept on, say, an external disk rather than in a RAM. In such case, therefore, one is compelled to rewrite all of the 600 dpi fonts in the RAM into 300 dpi fonts to effect the recovery, and then restore these fonts to the 600 dpi fonts. Such an operation is an impediment to an improvement in printing efficiency. The greater the distance of the paper conveyance path after the end of exposure, the greater the possibility that this problem will arise.

The foregoing problems are not limited to the postscript-type control unit but are encountered in all recording systems in which the control unit and printer unit are separated from each other.

SUMMARY OF THE INVENTION

An object of the present invention is to provide a recording system, printer control method and a printer apparatus which solve the aforementioned problems encountered in the prior art.

According to the present invention, the foregoing object is attained by providing a recording system comprising a printer unit in which recording density is capable of being changed over, and a control unit capable of sending a recording density changeover command to the printer unit via a prescribed interface, wherein the printer unit includes image forming means for forming an image on a recording medium, changeover means for changing over the recording density of the image, sensing means for sensing a recording operation in process in the printer unit, receiving means for receiving the changeover command from the control unit, and delay means responsive to outputs from the sensing means and the receiving means for delaying, during execution of the recording operation, communication of the changeover command to the changeover means until the recording operation ends.

In accordance with this arrangement, the operation for changing over the recording density is delayed by the delay means during the time that the recording operation is in effect. In other words, when the command for changing over the recording density is received during the recording operation, the recording density is changed over after the recording operation ends. The fact that the recording density change has ended on the side of the printer unit is communicated on the side of the control unit as well. Accordingly, all of the problems which arise in the aforementioned prior art are solved. In particular, the labor involved in repeating font formation processing any number of times in the event of malfunctions such as recording paper jamming, as is required in the prior art, is eliminated.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DESCRIPTION OF THE PREFERRED EMBODIMENT

Reference will now be had to the accompanying drawings to describe an embodiment in which the present invention is applied to a recording system comprising a control unit connected to an external host computer, and a laser beam printer.

Embodiment

Figure 1:
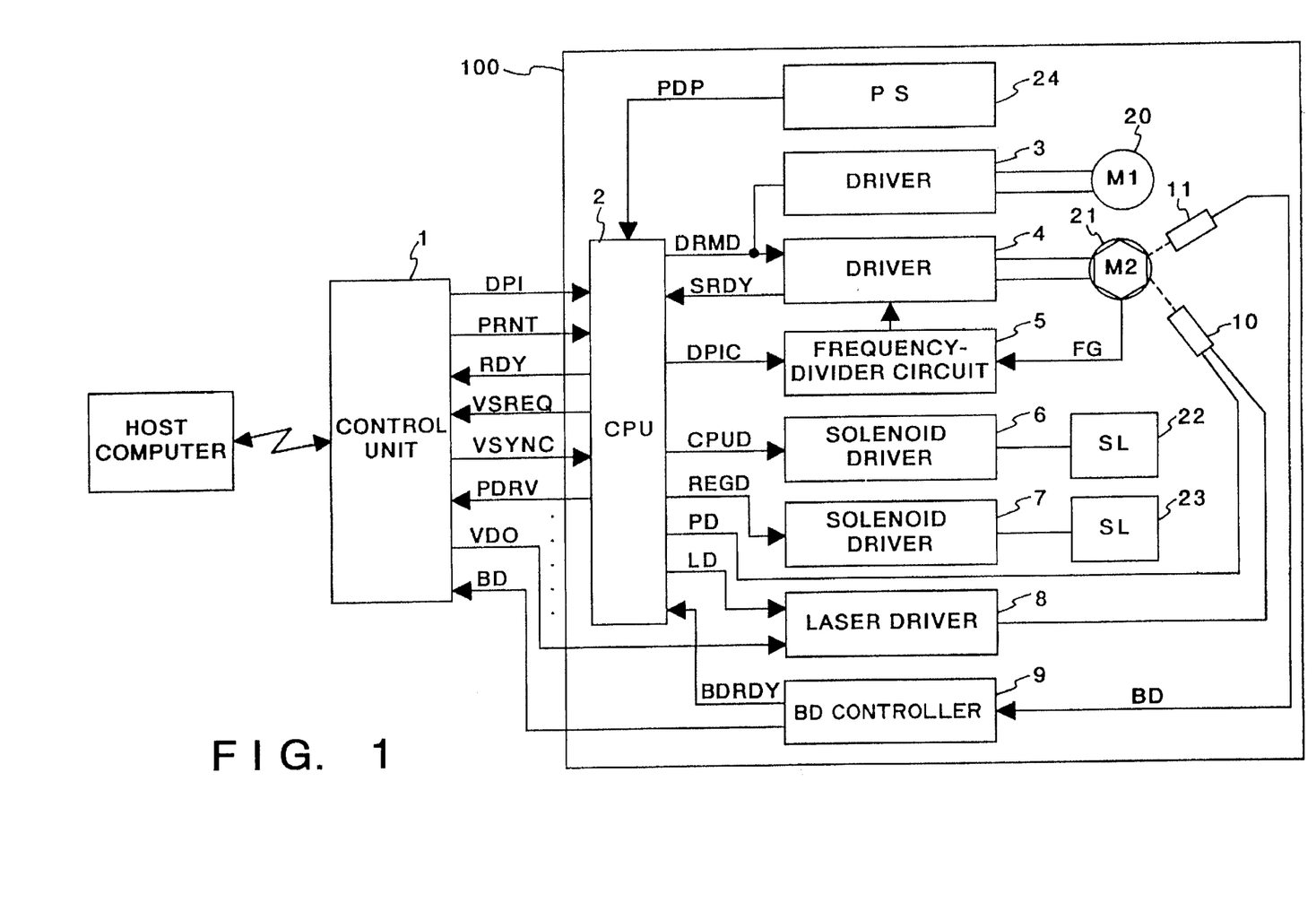
FIG. 1 is a block diagram illustrating a first embodiment of a recording system according to the present invention.

FIG. 1 is a block diagram illustrating the construction of an embodiment of a recording system according to the present invention. The recording system includes a printer control unit 1 for controlling image data delivered to a printer unit 100. The printer control unit 1 is disposed within the case of the printer unit 100 and is connected to an external host computer by a prescribed interface. The host computer sends printing data to the control unit 1 in the form of codes or vectors, and the control unit 1 converts the data into image data and then delivers the image data to the printer unit 100. The latter includes a single-chip microcomputer (hereinafter referred to as a "CPU") 2 which controls the operation of the printer unit 100; a main-motor drive circuit 3 for driving a main motor 20 which conveys paper and rotates a photosensitive drum; a polygon motor drive circuit 4 for driving a polygon motor 21; a frequency divider circuit 5 which frequency-divides an FG signal for sensing the rotational speed of the polygon motor 21; a drive circuit 6 for driving a paper-feed solenoid 22 which drives a paper-feed roller (not shown); a drive circuit 7 for driving a resist-roller solenoid 23 which drives a resist-roller (not shown); a laser drive circuit 8 for driving a laser 10 by an image signal VDO from the control unit 1; and a BD signal control circuit 9 for sending a beam detection signal BD, which is obtained through a beam detection sensor 11 owing to rotation of the polygon motor 21, to the control unit 1.

Figure 2:
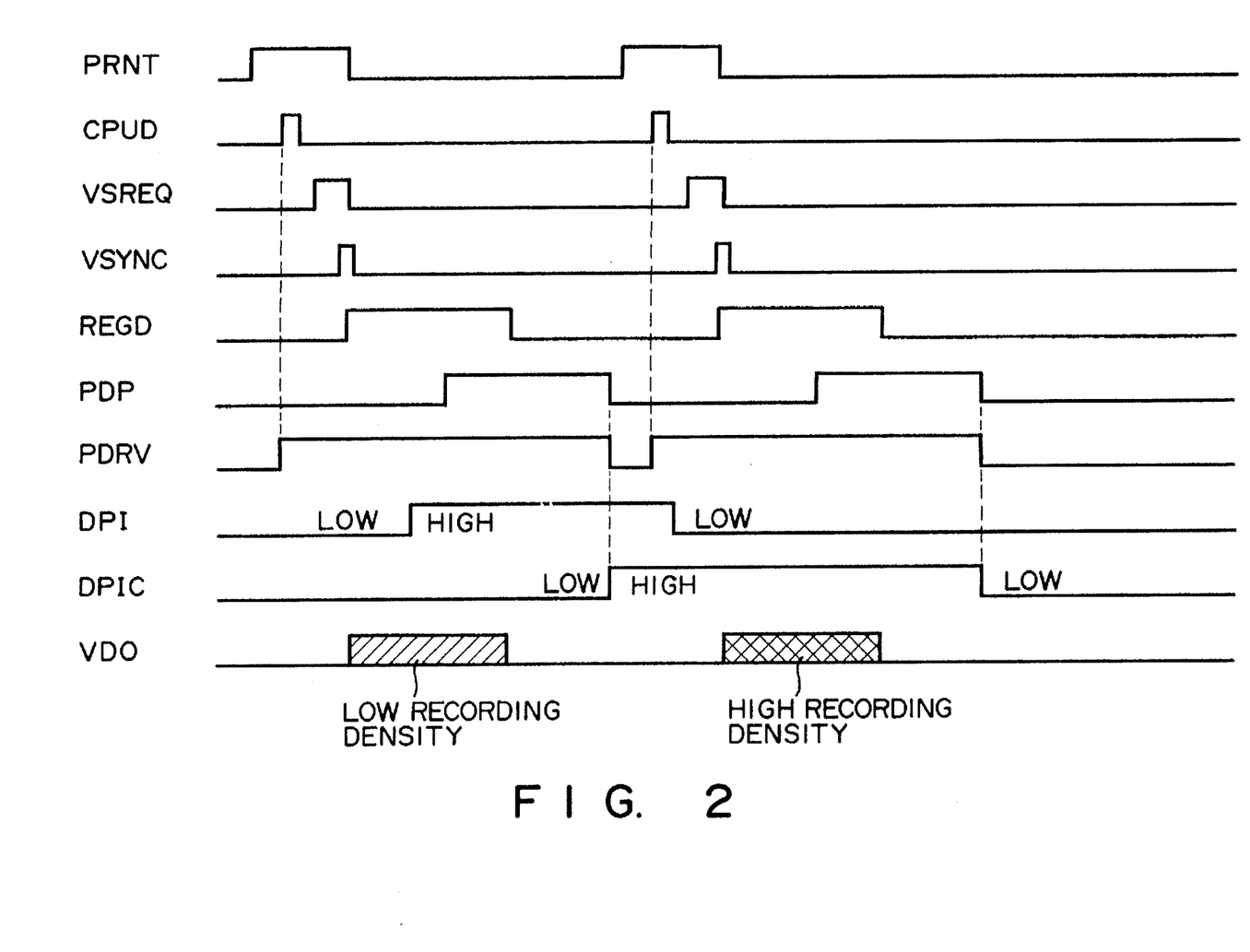
FIG. 2 is a timing chart of an interface in the first embodiment.

The interface between the printer unit 100 and control unit 1 will now be described with reference to FIGS. 1 and 2. When the printer unit 100 is in a state in which it is capable of recording, the CPU 2 turns on an RDY signal applied to the control unit 1. In a case where the host computer is commanding the control unit 1 to begin printing, the control unit 1 identifies the RDY signal and outputs a recording starting command (hereinafter abbreviated to a "PRNT signal") to the printer unit 100. Upon receiving the PRNT signal, the CPU 2 immediately starts a recording operation in which it turns on a main-motor drive signal DRMD (hereinafter abbreviated to a "DRMD signal") to rotate the main motor 20. The DRMD signal also serves as a polygon motor drive signal, which enters the drive circuit 3 to rotate the polygon motor 21 at the same time as the main motor 20 starts to rotate.

The polygon motor 21 produces FG pulses in conformity with the rotational speed thereof, and the FG pulses enter the frequency divider circuit 5. The control unit 1 sends a recording density signal (hereinafter abbreviated to a "DPI signal") to the CPU 2. In this system, high density is stipulated when the DPI signal is at a high level, and low density is stipulated with the DPI signal is at a low level. Thus, the density of recording is designated by this signal. The CPU 2 receives the DPI signal and outputs a recording density control signal (hereinafter abbreviated to a "DPIC signal") to the frequency divider circuit 5. The latter frequency-divides the FG pulses sent from the polygon motor 21 and outputs the result to the polygon motor drive circuit 4. The frequency dividing ratio is changed by the DPIC signal.

In this embodiment (and in the other modifications thereof which will be described later), the frequency dividing ratio is made 1:n when the DPIC signal is at the high level and 1:m when the frequency dividing ratio is at the low level. It will be assumed that the rotational speed of the polygon motor 21 is $R_H$ when the recording density is high (h dpi) and $R_L$ when the recording density is low (k dpi). When the relationship between the frequency dividing ratio of the FG pulses and the recording density ratio is $$n:m = R_H:R_L = h:k$$

controlling the current to the polygon motor 21 in such a manner that the period of the FG pulses frequency-divided by the frequency divider circuit 5 is rendered constant will make it possible for the polygon motor drive circuit 4 to stabilize the polygon motor 21 at the prescribed rotational speed without relation to recording density. Accordingly, the CPU 2 is capable of changing over the rotational speed of the polygon motor in dependence upon recording density by controlling the DPIC signal.

When the polygon motor attains the rotational speed that conforms to the recording density, the polygon motor drive circuit 4 turns on a polygon motor ready signal SRDY (hereinafter abbreviated to an "SRDY signal") and then outputs the signal to the CPU 2.

After the CPU 2 has rotated the main motor 20 and polygon motor 21 in response to the PRNT signal from the control unit 1, it turns on a paper-feed solenoid drive signal (hereinafter abbreviated to a "CPUD signal") to energize the solenoid 22. As a result, the paper-feed roller is rotated so that paper is extracted from a cassette and conveyed to the position of the resist-roller.

When the SRDY signal is detected, the CPU 2 turns on an auxiliary-scanning synchronizing signal request signal (hereinafter abbreviated to a "VSREQ signal") delivered to the control unit 1. Upon receiving the VSREQ signal and completing preparations for transmitting the image signal VDO, the control unit 1 outputs an auxiliary-scanning synchronizing signal VSYNC (hereinafter abbreviated to a "VSYNC signal"). The CPU 2 receives the VSYNC signal, turns off the VSREQ signal and, upon passage of a prescribed period of time, turns on a resist-roller solenoid drive signal REGD (hereinafter abbreviated to as an "REGD signal") to convey the recording paper. After outputting the VSYNC signal, the control unit 1 outputs the VDO signal upon passage of a prescribed period of time.

The control unit 1 synchronizes the VDO signal with a beam detection signal (hereinafter abbreviated to a "BD signal") and outputs the signal to the CPU 2. The BD signal is obtained as the polygon motor 21 rotates and the laser beam periodically irradiates a region outside that of the image. The laser drive circuit 8 modulates a laser drive signal LD from the CPU 2 by the VDO signal and causes a laser diode 10 to emit light in order to form a latent image on the photosensitive drum. The latent image is developed by a toner, the developed image is transferred to recording paper by a transfer device (not shown), and the recording paper is discharged from the printer unit 100 after the transferred image is fixed by a fixing device (not shown).

The fixing device is provided with a paper sensor (PS) 24, which sends a signal PDP to the CPU 2. By examining the signal PDP, the CPU 2 performs a monitoring operation to determine whether the paper passes through the fixing device correctly. If the paper sensor (PS) 24 is incapable of detecting the leading edge of the recording paper at a predetermined timing or the trailing edge of the recording paper at a predetermined timing, this is judged to indicate that paper jamming has occurred, and processing is executed to recover from such jamming.

In this embodiment, the interval from extraction of the paper by the paper-feed roller to the moment the trailing edge of the paper passes through the fixing device is taken as being the time period during which the recording operation substantially is in effect. During this period of time, a signal PDRV (hereinafter abbreviated to a "PDRV signal") which indicates that the recording paper is in the process of being conveyed is turned on and outputted to the control unit 1. In other words, when the PDRV signal is active, this means that the recording operation is in progress and that the preparatory operation which accompanies a change in recording density has not been completed on the side of the printer unit 100. Therefore, the control unit 1 does not proceed with the processing with accompanies a change in recording density.

Processing peculiar to the operation of this embodiment will be described in further detail with reference to the timing chart of FIG. 2. In the example of FIG. 2, when low-density recording is in progress on the side of printer unit 100, the host computer instructs the control unit 1 to change the recording density from low to high and then to request restoration of low-density recording. In response, the control unit 1 changes the DPI signal sent to the printer unit 100 from low (low density) to high (high density) and then back to low (low density). However, even if the CPU 2 detects that the DPI signal is high, it does not immediately change the DPIC signal to high, as illustrated in FIG. 2. As set forth earlier, the DPIC signal is sent to the frequency divider circuit 5 and is indicative of a change in dividing ratio.

Instead of changing the DPIC signal immediately in synchronism with the DPI signal, the CPU 2 verifies that the signal PDP outputted by the sensor 24 has attained the low level. The PDP signal is a signal which means that the recording paper has passed through the fixing device. If the PDP signal is not at the low level, the CPU 2 temporarily stores, in an internal RAM, the fact that the density changeover signal DPI has been received from the control unit 1. The CPU 2 continues to monitor the signal PDP. When it is confirmed that the signal PDP has attained the low level, the DPIC signal is changed from the low to the high level to alter the frequency dividing ratio. Furthermore, the PDRV signal is changed to the low level in synch with the negative-going transition of the signal PDP to inform the control unit 1 of the fact that the recording operation has ended before issuance of the printing density change command. As a result, the control unit 1 learns of the fact that preparations for density changeover on the side of printer unit 100 have been completed, transmits the PRNT signal to the CPU 2 and repeats the above-described processing cycle.

Thus, a change in density at least while exposure is in progress is avoided by synchronizing the change in the DPIC signal to confirmation of the PDP signal in response to the DPI signal. Further, since the PDRV signal is outputted to the control unit side in synch with confirmation of the PDP signal, the drawbacks of the prior art are eliminated. In other words, by virtue of this control, a recorded image can be assured regardless of the timing at which a recording density changeover command is received by the printer unit 100 from the control unit 1. In addition, by monitoring the PDRV signal sent from the CPU 2, the control unit 1 is capable of performing monitoring to determine whether or not the recording paper has emerged from the conveyance path. Furthermore, since the PDRV signal (=0) is issued by reason of the fact that recording paper is no longer present in the conveyance path and recording density has actually been changed over on the side of the printer unit 100, by monitoring this signal the control unit 1 is capable of determining whether the recording density has actually changed. This means that the control unit 1 is capable of correctly grasping the timing at which the font image data from the host computer is developed into raster image data for the new print recording density. In other words, if jamming should happen to occur in the course of operation, the PDRV signal remains at the high level at such time, and therefore the operation for changing the recording density will not be too far ahead on the control unit side.

Figure 3:
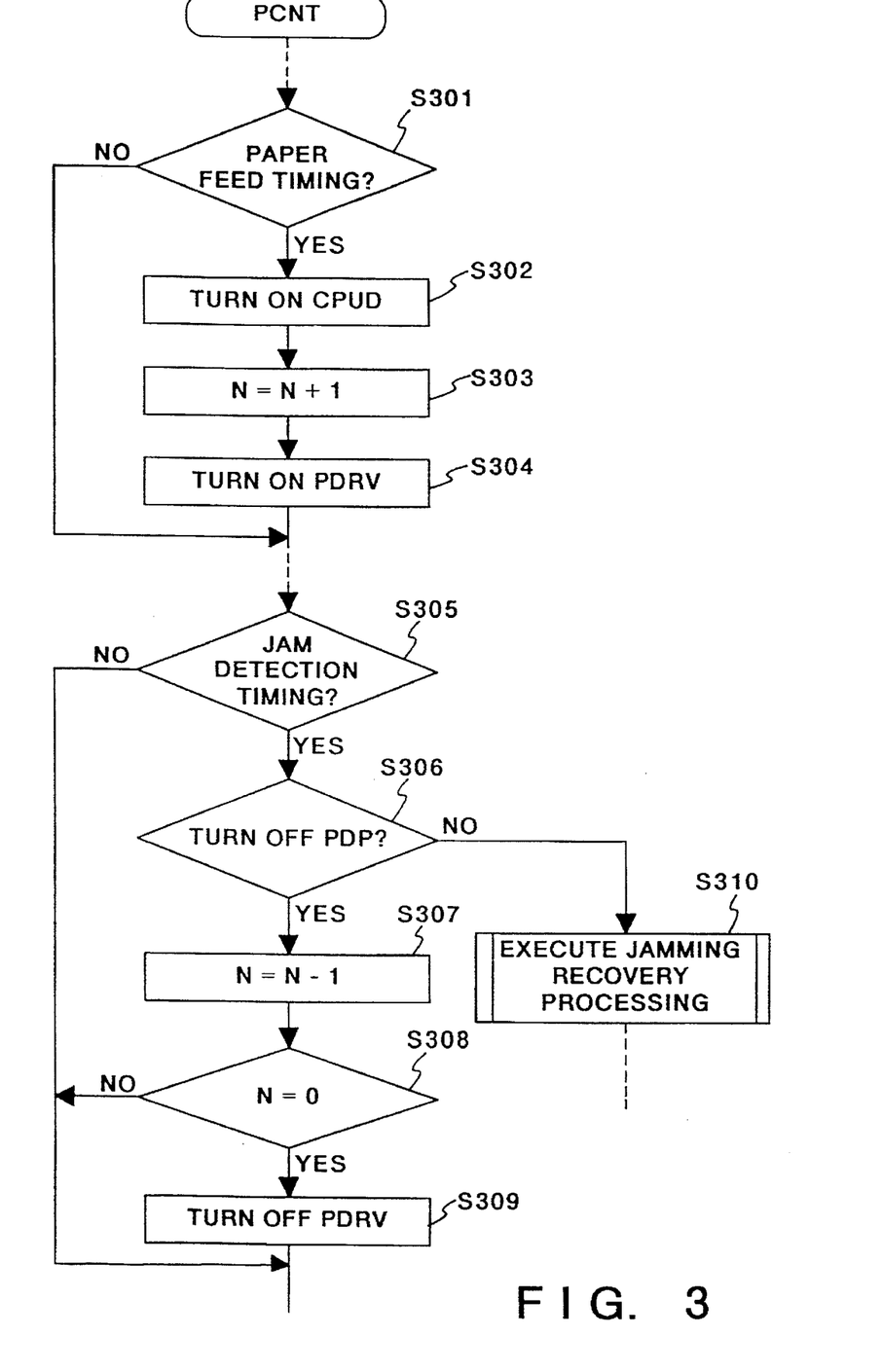
FIGS. 3 and 4 are flowcharts illustrating control procedures according to the first embodiment.
Figure 4:
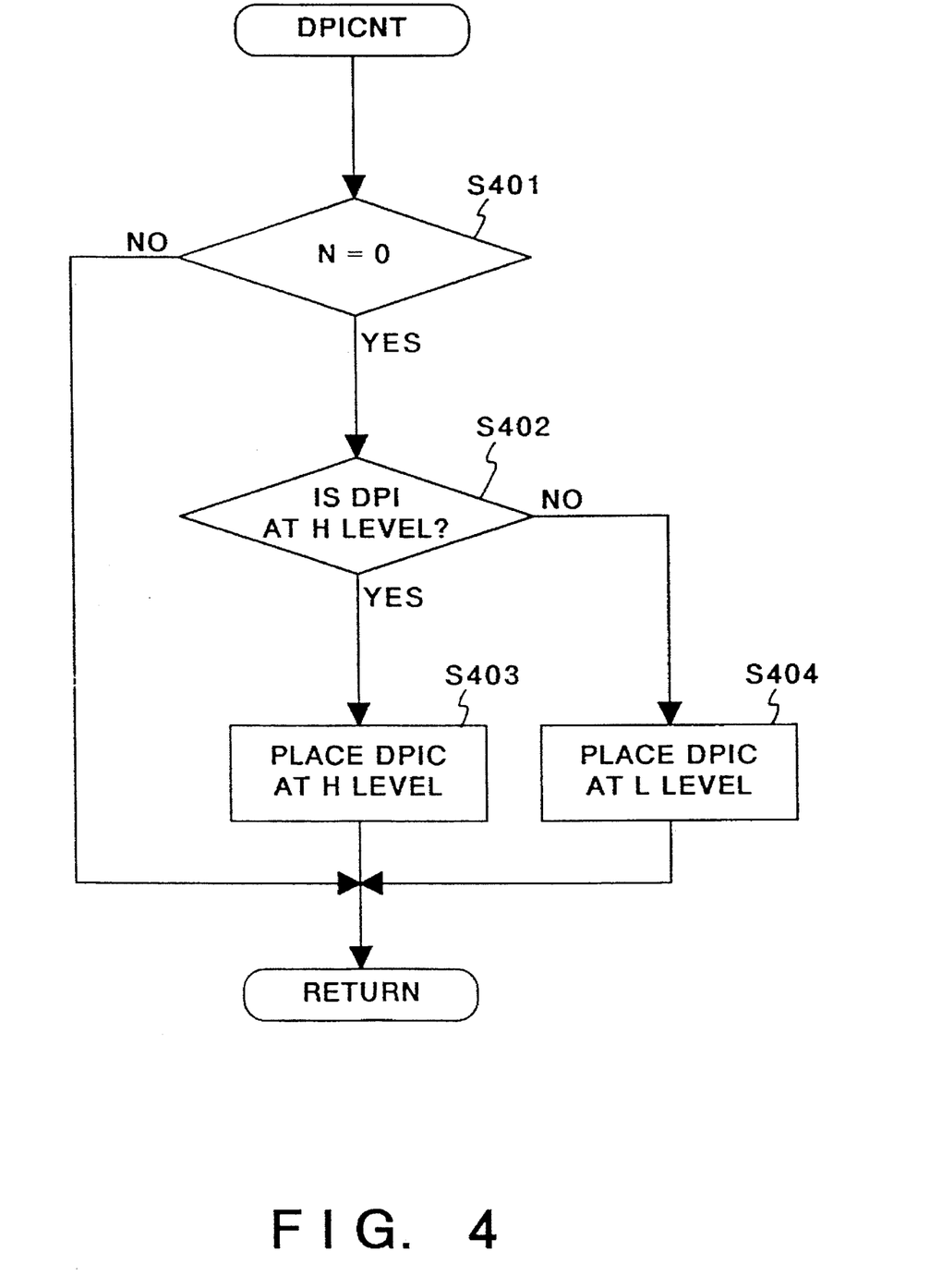

FIGS. 3 and 4 are control flowcharts associated with the CPU 2 for controlling the DPIC signal. FIG. 3 shows only part of the procedure for controlling a recording operation PCNT. At step S301, it is determined whether the timing in the recording operation is that for paper feed. If the timing is paper feed timing, then the CPUD signal for paper feed is turned on at step S302, and then a counter N whose content indicates the number of sheets of recording paper in the printer unit is counted up at step S303. At the same time, the PDRV signal, which indicates that paper conveyance is in progress, is turned on at step S304.

This is followed by step S305. Here, in order to judge the value of the signal PDP from the paper sensor 24 of the fixing device, it is determined whether the timing is that for sensing jamming. If the answer is YES, then it is determined at step S306 whether the PDP signal indicates absence of paper. If paper is present, jamming recovery processing is executed at step S310. If paper is not present, then the counter N whose content indicates the number of sheets in the apparatus is counted down at step S307. This is followed by step S308, at which the count in the counter is examined. If the count is "0", i.e., if the number of sheets of recording paper in the printer unit is zero, then the PDRV signal, which indicates that recording paper is in the process of being conveyed, is turned off at step S309.

FIG. 4 illustrates a control procedure DPIC for changing over the recording density. First, at step S401, it is determined whether the number N of sheets of recording paper in the printer unit is zero, namely whether the PDRV signal is ON. If the relation N=0 does not hold, this means that paper conveyance is in progress, and therefore the DPIC signal is not changed. If N=0 holds, the recording density command signal DPI is judged at step S402. If the signal is at the high level, the DPIC signal is raised to the high level at step S403; otherwise, the DPIC signal is placed at the low level at step S404.

Modifications

Four modifications in which the manners PDRV signal is send to control unit 1 vary, will be described below.

First Modification

Figure 5:
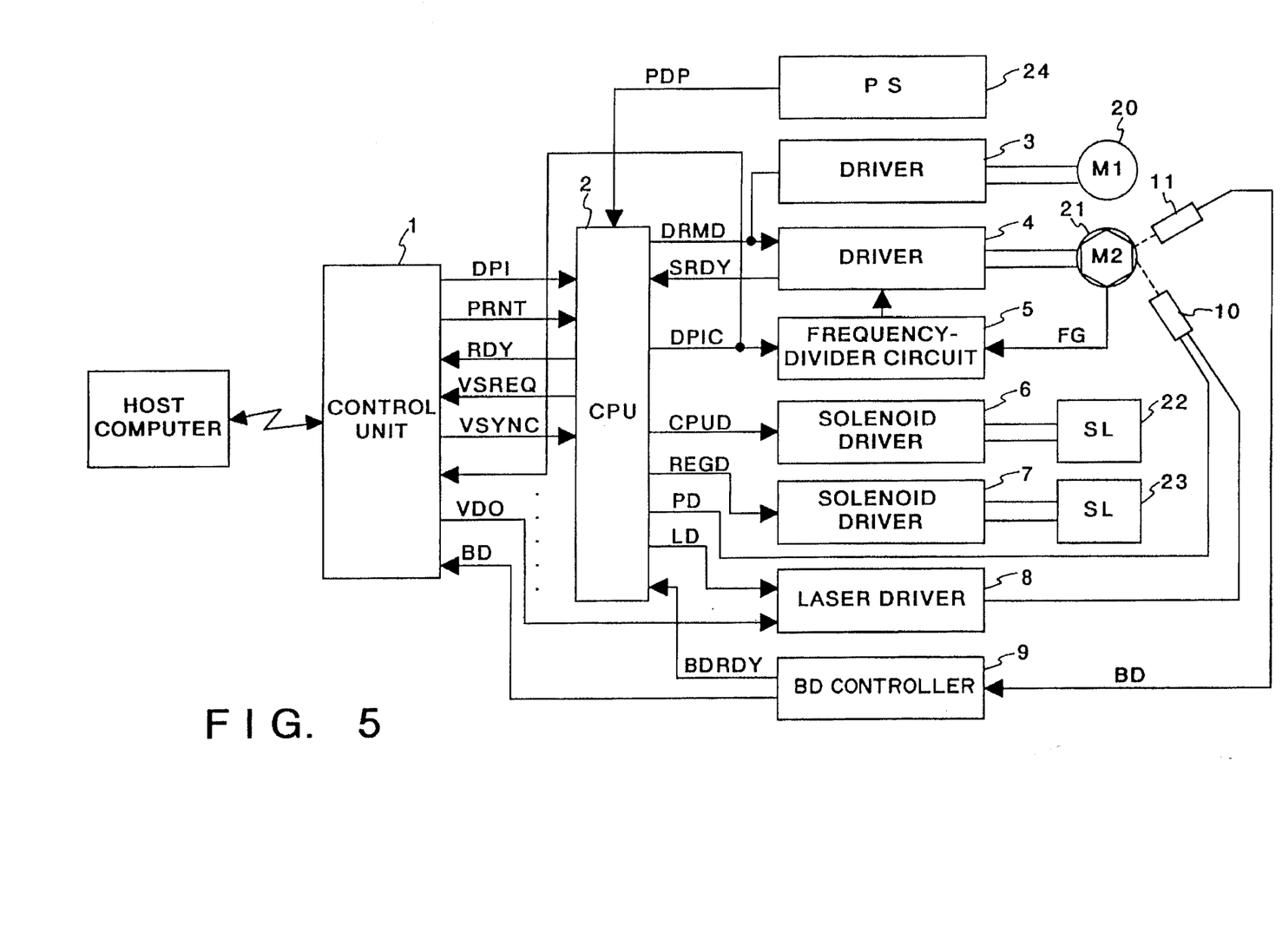
FIGS. 5 through 7 are block diagrams of first through fourth modifications of a recording system according to the present invention.

FIG. 5 is a circuit diagram according to a first modification. Here, instead of the arrangement of FIG. 1 wherein the signal PDRV, which indicates that paper conveyance is in progress, is delivered to the control unit 1, the arrangement is such that the DPIC signal sent from the CPU 2 to the frequency divider circuit 5, which changes over the rotational speed of the polygon motor 21, is outputted directly to the control unit 1. Since the CPU 2 changes over the DPIC signal upon judging the on/off status of the PDP signal, effects entirely the same as those of the above-described embodiment are obtained on the side of the control unit 1.

Second Modification

In the apparatus of FIGS. 1 and 5, the timing at which recording density is changed over by the DPI signal, which is the recording density command, is verified on the side of the control unit 1 based upon the PDRV signal or DPIC signal. However, there are many cases in which the control unit 1 and CPU 2 exchange other information by communication between CPUs possessed by both units. A second modification described below is proposed for such cases.

Specifically, instead of an arrangement which relies upon the DPI signal and DPIC signal, an arrangement can be adopted in which commands are transmitted from the control unit 1 to the CPU 2 and status is transmitted from the CPU 2 to the control unit 1. With such an arrangement, effects similar to those of the foregoing embodiment can be obtained. Furthermore, the number of signal lines between the control unit 1 and CPU 2 can be reduced.

Third Modification

In this modification, a changeover in recording density during paper conveyance is prohibited by hardware, with the object being to obtain effects similar to those of the embodiment shown in FIG. 1. The circuit arrangement is illustrated in FIG. 6.

Figure 6:
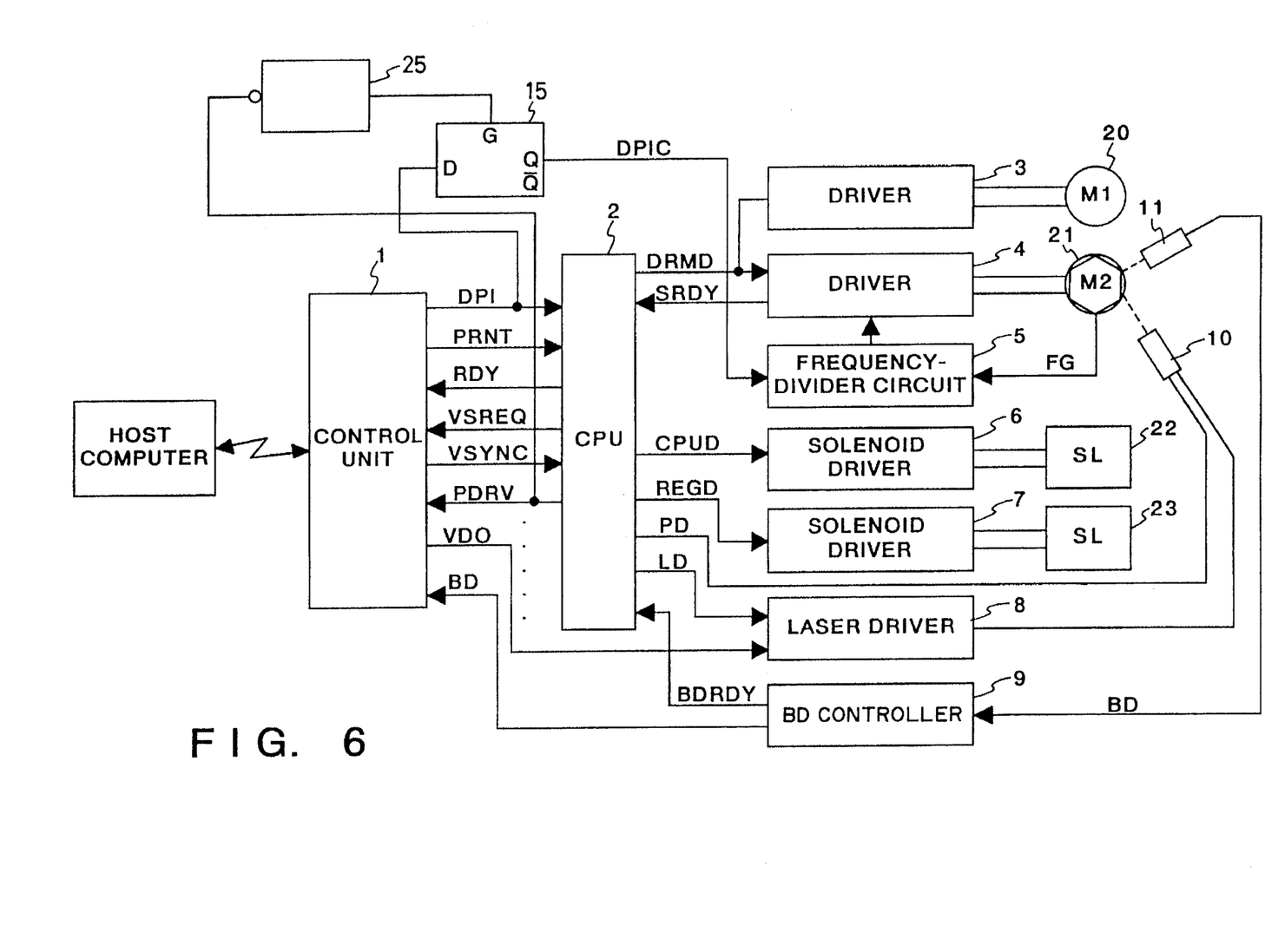

As shown in FIG. 6, the DPIC signal enters the frequency divider circuit 5 via a D-type latch 15. The clock (at G terminal) input to the latch 15 is the PDRV signal, which enters via a monostable multivibrator circuit 25. The data (at D terminal) input of the latch 15 is the DPI signal. The multivibrator circuit 25 detects a change in the PDRV signal from high to low and sends a pulse signal having a fixed width to the latch 15. In response to the pulse signal, the latch 15 stores the logical value of the signal DPI. In other words, the status of latch 15 does not change as long as the status of the PDRV signal does not change from high to low. It should be noted that the latch 15 can be constituted by a 74LS75 (a bistable latch), which is a TTL-type IC.

Fourth Modification

A fourth modification takes into consideration a case in which various optional devices are added to the recording system of the above-described embodiment.

Figure 7:
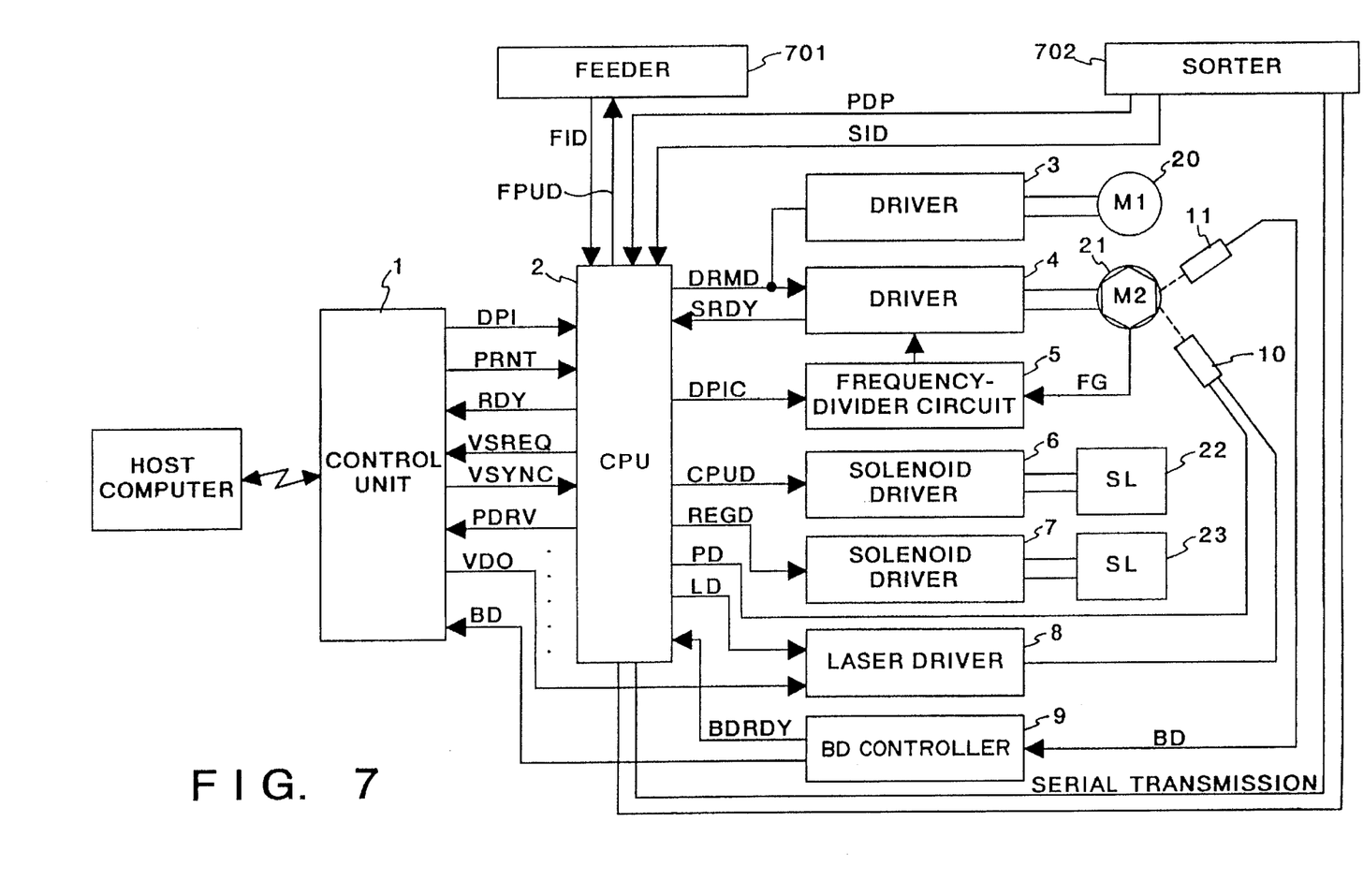

FIG. 7 is a block diagram for a case where optional devices are connected to the printer unit 100 of the recording system shown in FIG. 1. These devices include a feeder 701 which feeds recording paper in continuous fashion, and a sorter 702 for sorting sheets on which recording has been performed. The optional feeder 701 and sorter 702 are connected to the CPU 2 in printer unit 1 by signal lines, and they are controlled by the CPU 2. The latter determines whether the feeder 701 has been connected based upon a feeder ID signal FID (hereinafter abbreviated to an "FID signal"), and determines whether the sorter 702 has been connected based upon a sorter ID signal SID (hereinafter abbreviated to an "SID signal"). Paper feed from the feeder 701 and discharge to the sorter 702 are carried out in response to commands from the control unit 1.

Upon receiving a paper-feed command from the control unit, the CPU 2 transmits a paper-feed signal FPUD (hereinafter abbreviated to an "FPUD signal") to the feeder 701, which responds by feeding paper into the printer unit 100. The CPUD signal is turned on at a predetermined timing so that the paper fed in is conveyed to the resist-roller.

Upon receiving a sort command from the control unit 1, the CPU 2 designates a discharge bin in the sorter 702 and drives (by the SDRV signal) a roller (not shown) of the sorter 702 at the predetermined timing of paper conveyance. The sorter 702 possesses a sensor which monitors paper conveyance within the sorter. The sorter 702 issues a signal SPDP from this sensor to make possible monitoring of paper movement within the sorter.

In a case where these optional devices have been connected, the CPU 2 turns on the PDRV signal, which indicates that paper conveyance is in progress, when it transmits the FPUD signal to the feeder 701. The PDRV signal is maintained in the ON state until the time that the sensor signal SPDP outputted by the sorter 702 indicates that the trailing edge of the recording paper has passed.

As a result of this arrangement, the recording paper will be sorted correctly by the sorter 702 even if the recording density command from the control unit 1 is changed over during the time that the PDRV signal is high. The density is changed over only upon completion of the printing operation, and the timing of the changeover is capable of being indicated to the control unit 1.

Figure 8:
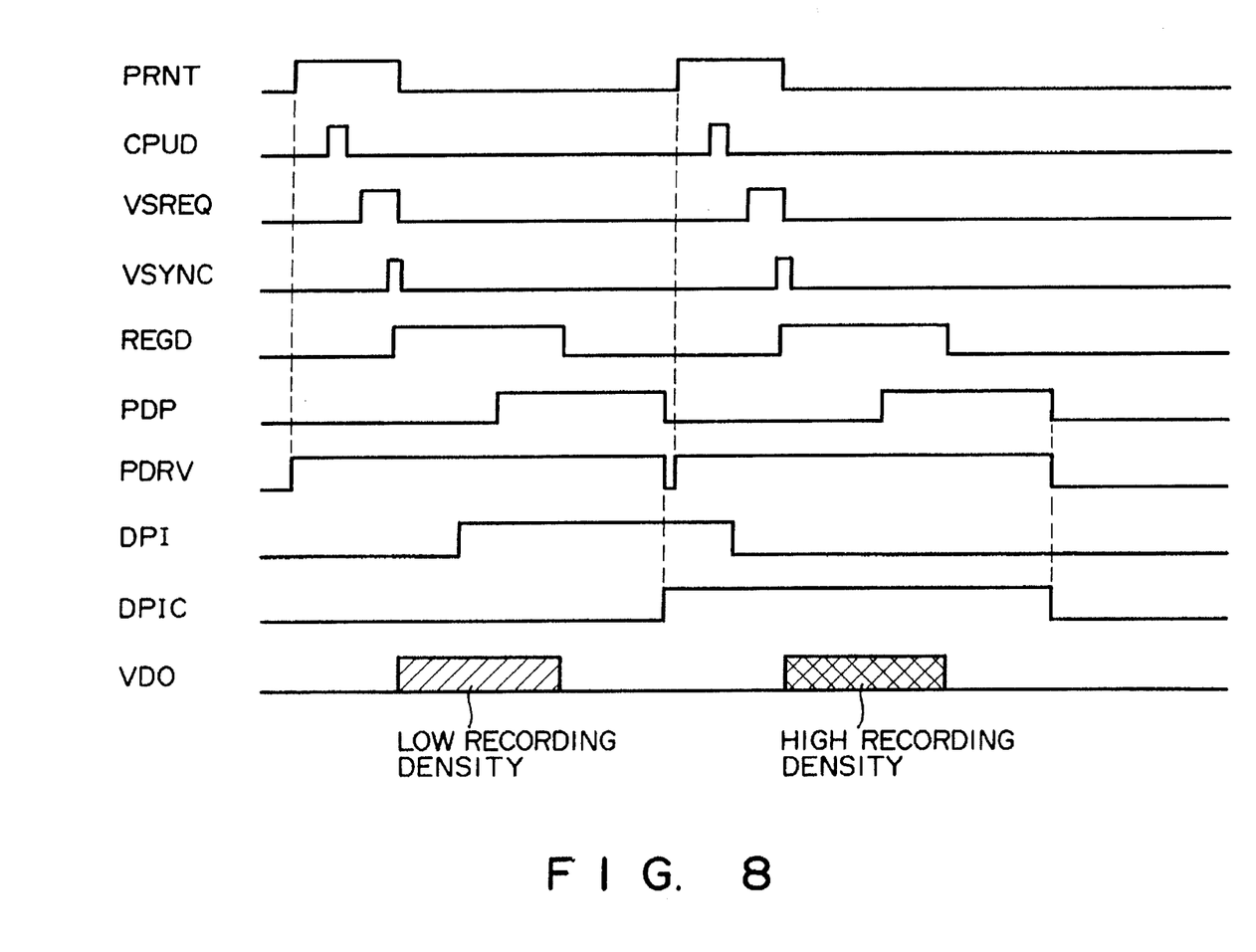
FIG. 8 is a timing chart of an interface in the fourth modification.

FIG. 8 is a timing chart illustrating the timing of recording density changeover in a case where the PDRV signal is turned on in conformity with the PRNT signal sent from the control unit 1. In a case where it is desired to change over the recording density of a page which will prevail after transmission of the next PRNT signal during the interval from turn-on of the PRNT signal by the control unit 1 to turn-off of the PDRV signal, the DPI signal can be transmitted without monitoring the turn-on timing of the PDRV signal. In this case also, effects similar to those of the embodiment shown in FIG. 1 can be obtained.

One embodiment and four modifications are described hereinabove, in which work is allotted in such a manner that the control unit 1 has an image developing function while the CPU 2 performs sequence control for the electrophotographic process. In other words, the embodiment and four modifications are examples of a postscript-type recording system. However, these do not impose a limitation upon the present invention, for the invention is applicable also to a well-known recording system of the type which performs printed image formation on the side of the host computer. That is to say, the present invention can be applied so long as the system is of the type in which sequence control for recording or printing and control for forming a recorded image in a RAM are executed independently of each other.

The present invention has a number of advantages. Specifically, in accordance with the present invention as described above, the arrangement is such that when a recording density changeover command is received during a recording operation, the recording density is changed over after the recording operation ends. In addition, since the control unit side is informed of the fact that measures for changing recording density have been completed on the side of the printer unit, all of the problems that arise in the prior art are solved. In particular, the labor involved in repeating font formation processing any number of times in the event of malfunctions such as recording paper jamming, as is required in the prior art, is eliminated.

As many apparently widely different embodiments of the present invention can be made without departing from the spirit and scope thereof, it is to be understood that the invention is not limited to the specific embodiments thereof except as defined in the appended claims.

What is claimed is:

1. A recording system comprising a printer unit in which recording density is capable of being changed over, and a control unit capable of sending a recording density changeover command to the printer unit via a prescribed interface, wherein said printer unit includes:

image forming means for forming an image on a recording medium;

changeover means for changing over the recording density of the image;

sensing means for sensing a recording operation in process in said printer unit;

receiving means for receiving the changeover command from said control unit;

delay means responsive to outputs from said sensing means and said receiving means for delaying, during execution of the recording operation, communication of the changeover command to said changeover means until the recording operation ends; and responding means responsive to an output from said delay means for sending a reply signal to said control unit via said interface, said reply signal indicating that changeover of recording density is complete, whereby said control unit can recognize when the changeover of recording density has been performed in said printer unit.

2. The system according to claim 1, wherein said recording means includes a polygon mirror for scanning a laser beam horizontally across the recording medium and said changeover means includes means which alters the rotational speed of the polygon mirror in response to said changeover command.

3. The system according to claim 1, wherein said control unit starts sending recording data to said printer unit via said interface upon receiving the reply from said responding means to the effect that changeover of recording density has been performed.

4. The system according to claim 1, wherein the recording operation includes operations from feeding of paper, which serves as the recording medium, into said printer unit proper, to discharge of all paper out of said control unit proper.

5. The system according to claim 1, wherein recording by the printer unit is carried out by an electrophotographic process, and said recording operation starts with feed of a recording paper in response to start of recording from said control unit and lasts until the recording paper passes through a fixing path.

6. The system according to claim 1, wherein said recording operation is in progress from a point in time at which a paper conveying motor starts to be driven, or a point in time at which a paper feed operation is started, based upon a recording command from said control unit, until a point in time at which paper sensing means, provided at a downstream-most location of a paper conveyance path, senses a trailing edge of a recording paper.

7. The system according to claim 1, wherein said printer unit is capable having a paper feeder or a sorter attached externally thereto, and said recording operation has control means for adopting, as the end of the recording operation, at point in time at which paper sensing means, provided at a downstream-most location of a paper conveyance path, senses a trailing edge of a recording paper after start of paper feed.

8. A method for controlling a printer, comprising the steps of:

receiving a changeover command to change over recording density;

sensing whether a recording operation is in progress when receiving said changeover command;

delaying a changeover operation of recording density until the end of said recording operation in a case where said recording operation is sensed to be in progress when the command is received; and sending a signal to an external apparatus indicating that the changeover operation is delayed and is not yet complete, whereby said external apparatus may recognize when the changeover of recording density has not been performed in said printer unit.

9. A printing apparatus capable of performing a printing operation at one of the plurality of printing resolutions, comprising:

an interface for inputting image data as well as a resolution designating signal for designating one of a plurality of resolutions from an external apparatus;

image forming means for forming an image, based on the input image data, at a set resolution; and control means for setting the resolution of said image forming means based upon said resolution designating signal to be inputted via said interface, and for sending a signal relating to a timing of resolution changeover operation to the external apparatus via said interface, whereby said external apparatus may recognize when the resolution changeover operation has been performed in said printing apparatus.

10. The apparatus according to claim 9, wherein said image forming means includes a polygon mirror for scanning a laser beam across a recording medium, and resolution is changed over by changing the rotational speed of said polygon mirror.

11. The apparatus according to claim 9, further comprising:

paper feeding means for feeding recording paper to said image forming means; and detecting means for detecting the recording paper on a conveyance path of the recording paper;

wherein said control means judges whether the image forming operation is in progress based upon the operating state of said paper feeding means or an output signal from said detecting means, and sends a signal relating to the timing of a resolution changeover operation of said image forming means on the basis of the judgement.

12. The apparatus according to claim 9, wherein said control means sends, as said signal relating to the timing of resolution changeover operation, a signal indicating the resolution changeover operation is acceptable in the printer, to the outside via said interface.

13. The apparatus according to claim 9, wherein said control means sends, as said signal relating to the timing of resolution changeover operation, a signal indicating the printer can accept said resolution designating signal, to the outside via said interface.

14. A printing apparatus capable of performing a printing operation at one of a plurality of printing resolutions, comprising:

an interface for inputting image data and a resolution designating signal;

image forming means for forming an image on a recording paper;

paper feeding means for feeding the recording paper from paper supply means along a conveyance path to said image forming means;

detecting means for detecting a conveyance state on the conveyance path of the recording paper; and control means for causing said apparatus to delay a resolution changeover operation in accordance with the detected conveyance state of the recording paper at the time when the resolution designating signal is inputted.

15. An image forming apparatus comprising:

an image forming unit capable of performing an image forming operation at one of a plurality of recording resolution on the basis of the image data sent from an external signal source unit;

a controller unit for changing over the recording resolution of the image forming unit; and a paper feeding unit for feeding a paper from paper supply means along a conveyance path through the image forming unit and being capable of simultaneously feeding a plurality of papers along the conveyance path, and wherein said controller unit is capable of changing the recording resolution of the image forming unit only in a case where no paper is being fed along the conveyance path.

16. The apparatus according to claim 15, wherein said controller unit changes the recording resolution of the image forming unit in response to a changeover command sent from said external signal source unit.

17. The apparatus according to claim 15, wherein said image forming unit comprises:

means for modulating light beam in accordance with the image data sent from the external signal source unit; and deflection means for deflecting the modulated light beam.

18. The apparatus according to claim 16, wherein said controller unit comprises means for outputting information relating to a changeover timing of the recording resolution to said external signal source unit.

19. The apparatus according to claim 14, wherein said image forming means includes a polygon mirror for scanning a laser beam across a recording medium, and resolution is changed over by changing the rotational speed of said polygon mirror.

20. The apparatus according to claim 14, wherein said control means sends a signal relating to the timing of a resolution changeover operation of said image forming means.

21. The apparatus according to claim 20, wherein said control means sends, as said signal relating to the timing of resolution changeover operation, a signal indicating the resolution changeover operation is acceptable in the printing apparatus, to the outside via said interface.

22. An apparatus for controlling a printing apparatus capable of performing a printing operation at one of a plurality of printing resolutions, comprising:

an interface for inputting image data as well as a resolution designating signal for designating one of a plurality of resolutions from an external apparatus; and control means for setting the resolution of said printing apparatus based upon said resolution designating signal to be inputted via said interface, and for sending a signal relating to a timing of resolution changeover operation to the external apparatus via said interface, so that said external apparatus may recognize when the resolution changeover operation has been performed in said printing apparatus.

23. The apparatus according to claim 22, wherein said image forming means includes a polygon mirror for scanning a laser beam across a recording medium, and resolution is changed over by changing the rotational speed of said polygon mirror.

24. The apparatus according to claim 22, wherein said control means sends, as said signal relating to the timing of resolution changeover operation, a signal indicating the resolution changeover operation is acceptable in the printing apparatus, to the outside via said interface.

25. The apparatus according to claim 22, wherein said control means sends, as said signal relating to the timing of resolution changeover operation, a signal indicating the printer can accept said resolution designating signal, to the outside via said interface.

26. A method for controlling printing apparatus capable of performing a printing operation at one of a plurality of printing resolutions, comprising the steps of:

conveying a recording sheet along a conveyance path;

forming an image on the recording sheet which is being conveyed;

inputting a resolution designation signal; and controlling a timing when a resolution changeover operation is performed in accordance with the input resolution designating signal and the conveyance state of the recording sheet.

27. A method according to claim 26, wherein said printing apparatus includes a polygon mirror for scanning a laser beam across an image bearing member, and the resolution changeover operation includes an operation for changing the rotational speed of said polygon mirror.

28. A method according to claim 26, further comprising a step of outputting a signal relating to a timing of the resolution changeover operation of said printing apparatus.

29. A method according to claim 28, wherein in said outputting step, as said signal relating to the timing of the resolution changeover, a signal indicating the resolution changeover operation is acceptable in the printing apparatus is outputted.

30. A method according to claim 26, wherein in said conveying step, a plurality of recording sheets can be simultaneously conveyed along the conveyance path, and wherein in said controlling step, the timing is set so that the resolution changeover operation is not performed when at least one paper is being conveyed along the conveyance path.

31. A printing apparatus capable of performing a printing operation at one of a plurality of printing resolutions, comprising:

means for inputting a resolution designating signal;

conveying means for conveying a recording sheet along a conveyance path;

image forming means for forming an image on the recording sheet which is being conveyed by said conveying means; and control means for controlling a timing when a resolution changeover operation is performed in accordance with the input resolution designating signal and the conveyance state of the recording sheet.

32. The apparatus according to claim 31, wherein said image forming means includes a polygon mirror for scanning a laser beam across an image bearing member, and resolution is changed over by changing the rotational speed of said polygon mirror.

33. The apparatus according to claim 31, wherein said control means outputs a signal relating to a timing of the resolution changeover operation of said apparatus.

34. The apparatus according to claim 33, wherein said control means outputs a signal indicating the resolution changeover operation is acceptable in the printing apparatus, as said signal relating to the timing of the resolution changeover operation.

35. The apparatus according to claim 31, wherein said conveying means is capable of simultaneously conveying a plurality of recording sheets along the conveyance path, and wherein said control means controls the timing so that the resolution changeover operation is not performed when at least one recording sheet is being conveyed along the conveyance path.

36. The apparatus according to claim 31, further comprising means for detecting a conveyance state of the recording sheet which is being conveyed, wherein the control means controls the timing when a resolution changeover operation is performed in accordance with the input resolution designating signal and a detection result of said detecting means.

37. The apparatus according to claim 36, wherein said detecting means detects whether a recording sheet is being conveyed along the conveyance path, and when the detecting means detects a recording sheet which is being conveyed along the conveyance path said control means controls the timing so that the resolution changeover operation is not performed.

* * * * *